(12) United States Patent
Hopcraft et al.

(10) Patent No.: US 9,439,044 B2
(45) Date of Patent: Sep. 6, 2016

(54) MECHANISM FOR DETERMINING LOCATION HISTORY VIA MULTIPLE HISTORICAL PREDICTORS

(71) Applicant: Tektronix, Inc., Beaverton, OR (US)

(72) Inventors: Geoff Hopcraft, Beaverton, OR (US); James Blondin, Beaverton, OR (US)

(73) Assignee: Tektronix Texas, LLC, Westford, MA (US)

( * ) Notice: Subject to any disclaimer, the term of this patent is extended or adjusted under 35 U.S.C. 154(b) by 0 days.

(21) Appl. No.: 14/596,883

(22) Filed: Jan. 14, 2015

(65) Prior Publication Data

US 2016/0205509 A1 Jul. 14, 2016

(51) Int. Cl.
*H04W 4/02* (2009.01)
*H04W 64/00* (2009.01)
*H04W 4/04* (2009.01)

(52) U.S. Cl.
CPC ............ *H04W 4/028* (2013.01); *H04W 4/027* (2013.01); *H04W 4/046* (2013.01); *H04W 64/003* (2013.01); *H04W 64/006* (2013.01)

(58) Field of Classification Search
CPC ...... H04W 4/023; H04W 4/021; H04W 4/22

USPC .......... 455/404.2, 456.1, 67.11, 115.1, 115.3
See application file for complete search history.

(56) References Cited

U.S. PATENT DOCUMENTS

| | | | |
|---|---|---|---|
| 6,609,063 B1 | 8/2003 | Bender et al. | |
| 6,662,105 B1* | 12/2003 | Tada | G01C 21/34 340/990 |
| 2009/0201149 A1* | 8/2009 | Kaji | G01S 5/0294 340/539.13 |

* cited by examiner

*Primary Examiner* — Cong Tran
(74) *Attorney, Agent, or Firm* — Locke Lord LLP; Scott D. Wofsy; Christopher Capelli

(57) ABSTRACT

A method for determining location history of a mobile device is provided. A plurality of states corresponding to a plurality of reachable road segments associated with a road network is determined based on one or more initial estimated locations of the mobile device. Mobility model defining transition probabilities between the determined plurality of states is generated. Time series network data associated with the mobile device is received from a network data source. The time series network data is associated with a given period of time. The time series network data is processed using the generated mobility model to estimate an actual route most likely travelled by the mobile device during the given time period.

16 Claims, 7 Drawing Sheets

MECHANISM FOR DETERMINING LOCATION HISTORY VIA MULTIPLE HISTORICAL PREDICTORS

FIELD OF THE INVENTION

The present invention relates to determining the location of an object and tracking the object and, more particularly, relates to locating and tracking a user of a wireless network via multiple predictors over time.

BACKGROUND OF THE INVENTION

Currently in the art, there are a number of different ways to geolocate a mobile device.

For instance, conventional technologies often use a Global Positioning System (GPS) device to determine the positions (location data) of mobile communication devices thereafter transmitting the locations data, preferably via a wireless network, to targeted businesses. While this approach may give accurate information, battery life of a device may be degraded by GPS technology. Further, GPS devices might be deemed too intrusive by some customers.

In addition, providers of wireless communication services have installed mobile device location capabilities into their networks. In operation, these network overlay location systems take measurements on radio frequency ("RF") transmissions from mobile devices at base station locations surrounding the mobile device and estimate the location of the mobile device with respect to the base stations using well-known triangulation methods. Because the geographic location of the base stations is known, the determination of the location of the mobile device with respect to the base station permits the geographic location of the mobile device to be determined. However, environments in which a user of the mobile device travels freely, such as a road network, pose a special challenge for accurate location determination. Typically non-stationary users will not have enough measurements associated with their devices at a single base geographic location for precise triangulation.

In general, measurements provided by base stations are often corrupted by white noise. It is known in the art that various smoothing techniques, such as Kalman filtering, may be used to improve estimation results. The Kalman filter produces values that tend to be closer to the true values of the measurements and their associated calculated values by predicting an estimate of uncertainty of the predicted value via a weighted average of the predicted and measured values. When using a Kalman filter to filter noisy location estimates, it is assumed that error terms and measurements have a Gaussian distribution. However, location estimates received from different sources (e.g., different types of sensors) may be multi-modal. As a result, filtering the multi-modal location estimates using a single Kalman filter may yield a location estimate that is inconsistent and erratic over time. Furthermore, Kalman filtering does not take into account the terrain and road networks over which the user travels.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for determining location history of a mobile device is provided. A plurality of states corresponding to a plurality of reachable road segments associated with a road network is determined based on one or more initial estimated locations of the mobile device. A mobility model defining transition probabilities between the determined plurality of states is then generated. Time series network data associated with the mobile device is received from a network data source. The time series network data is associated with a given period of time. The time series network data is processed using the generated mobility model to estimate an actual route travelled by the mobile device along a portion of the road network during the given time period.

In another aspect, a computer program product for determining location history of a mobile device is provided. The computer program product includes one or more computer-readable storage devices and a plurality of program instructions stored on at least one of the one or more computer-readable storage devices. The plurality of program instructions includes program instructions to determine a plurality of states corresponding to a plurality of reachable road segments associated with a road network based on one or more initial estimated locations of the mobile device. The plurality of program instructions further includes program instructions to generate a mobility model defining transition probabilities between the determined plurality of states. The plurality of program instructions further includes program instructions to receive time series network data associated with the mobile device from a network data source. The time series network data is associated with a given period of time. The plurality of program instructions further includes program instructions to process the time series network data using the generated mobility model to estimate an actual route travelled by the mobile device along a portion of the road network during the given period of time.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
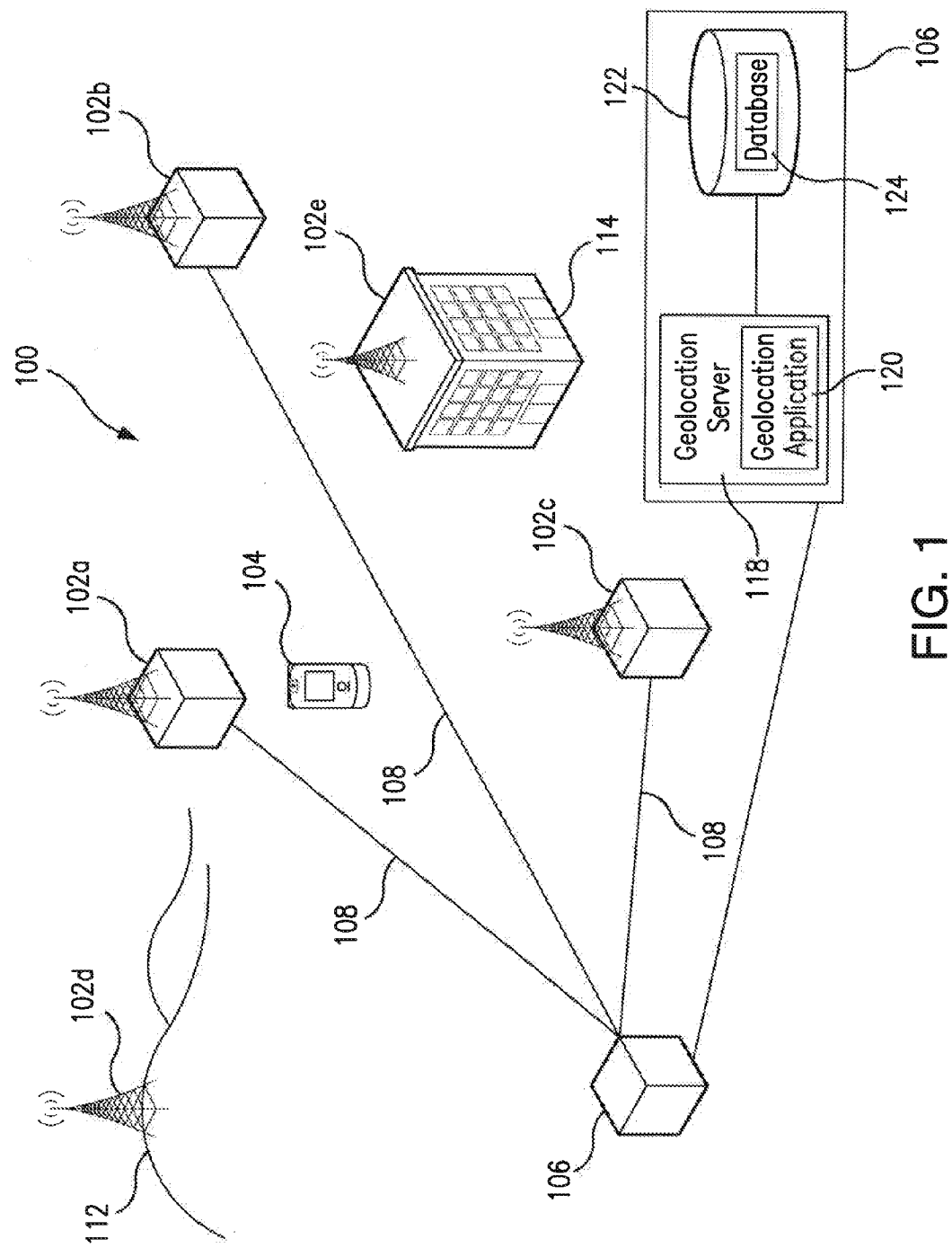
FIG. 1 illustrates an exemplary wireless communication system in which illustrated embodiments of the present invention may be implemented.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below.

The term "geolocation", as used herein, refers to a geographic location of a mobile device as well as geographic location of a communication event observed by user equipment. The term "communication event", as used herein, refers to any incoming or outgoing communication to or from a mobile device. Communication events include mobile station attachment, detachment, handover procedures, telephone calls, both sent and received, SMS messages both sent and received, e-mail correspondences both sent and received, and wireless application protocol sessions, among other data based transactions. Each communication event has at least two parties, the user of the mobile device and at least one correspondent element. As used herein, movement of a mobile device includes movement of a car carrying the mobile device. The term "likelihood" may refer to a probability or chance of an event occurring, and may be expressed as a probability value, fraction, or percentage. The term "likelihood" as used herein may include the concept of a "probability" as used in mathematics and by persons of ordinary skill in the arts of statistical analysis and state machine modeling and implementations.

Turning now descriptively to the drawings, in which similar reference characters denote similar elements throughout the several views, FIG. 1 depicts an exemplary wireless communication system in which illustrated embodiments of the present invention may be implemented.

FIG. 1 shows a conventional wireless communication system 100 having base stations 102a-e for communicating with a mobile device 104. Each base station 102a-e contains signal processing equipment and an antenna for transmitting to and receiving signals from the mobile device 104 as well as other base stations 102a-e.

A Mobile Switching Center ("MSC") 106 typically is connected to each base station 102a-e through wireline connection 108. The MSC 106 may include a geolocation server 118. In the normal course of operation, the geolocation server 118 is tasked to generate an estimated travel history associated with a particular mobile device for a given time period. The tasking is accomplished by retrieving previously collected and accumulated information on the mobile device of interest. In one embodiment such information is collected by the plurality of base stations 102a-e. The geolocation server 118 then employs the retrieved information in combination with loaded road network data to estimate an actual route most likely travelled by a mobile device during the given period of time by running a geolocation application 120, as described below.

The base stations 102a-e may be configured to make measurements and collect a variety of data. The data collected by the base stations 102a-e may include, for each signal detected, the signal source's identification information, such as a IMSI (International mobile Subscriber Identity), MSISDN, MAC (Media Access Control) or EUI (Extended Unique Identifier) identifier or the signal's frequency; the signal's average signal strength; the standard deviation of its signal strength; and its yield, which is a measure of how often the signal is detected over a given time period. When monitoring, the base station 102a-e may collect a plurality of samples, or "polls", of the detectable signals.

In addition to collecting signal-related information, the base stations 102a-e may collect a plurality of control parameters. For example, when the mobile device 104 initiates or receives a call or text message, radio communication takes place between the device and a base station, for example, base station 102a. In addition to transmitting an encoding of the message passing between caller and call recipient, the mobile device 104 and the base station 102a transmit a large amount of control information between themselves for the purposes of reliably and efficiently supporting the call and passing it between base stations 102a-e as the user operating mobile device 104 moves about. This control information may contain information on the signal strength of neighboring base stations, network's propagation path time measurements (e.g., timing advance information, propagation delay), transmission error rates and much more. Collectively these parameters are referred to herein as the "control parameters". From this information, the geolocation server 118 determines historical network information related to the geolocation of the mobile device 104 and the geolocation of the corresponding communication events, as described below.

It is noted that the mobile device 104 is depicted in FIG. 1 as a mobile wireless device such as a cell phone or smart phone. However, it may be any portable device, such as a laptop, notebook, tablet computer, palm-sized computer, or any electronic device with capability to receive telecommunication (i.e. wireless) signals.

Geolocation application 120 may comprise program instructions stored on one or more computer-readable storage devices, which may include internal storage on the geolocation server 118. Geolocation application 120 may be, for example, a computer program or program component for determining accurate geolocation information by using probabilistic techniques based on accumulated network data in combination with road network data. Data gathered, generated, and maintained for use by the geolocation application 120 may be kept in the internal storage of the geolocation server 118 or in one or more databases 124 of a storage unit 122 contained within the MSC 106.

The wireless communication system 100 shown in FIG. 1 may comprise a radio access network (RAN). For purposes of the present patent application, the RAN may be implemented in any combination of known or heretofore unknown radio access technology and network protocols. For instance, the RAN may comprise a combination of UMTS Terrestrial Radio Access Network (UTRAN), Wireless Local Area Network (WLAN), Digital Enhanced Cordless Technology (DECT), GSM EDGE Radio Access Network (GERAN), Worldwide Interoperability for Microwave Access (WiMAX) network, Device to Device (D-D), etc. The RAN can also be an aggregation of channels from multiple bands in the radio access technology LTE-A (Long Term Evolution - Advanced). LTE-A is a set of enhancements to the UMTS that includes an all-IP networking architecture and the ability of each base station to connect to multiple core networks.

According to an embodiment of the present invention, the location determination process employs a model of the road network. In certain cases, the location determination processing may be targeted to only a subset of the traffic bearing roads in the network. As an example, the processing may be focused only on a portion of the road network in a vicinity of base stations with which time series data of interest is associated with. In this case a complete model of the road network may be provided together with an indication of the subset of road segments on which to estimate an actual route most likely travelled by the mobile device of interest. Such road network data could be obtained from a third party source and manually loaded via a management interface into one or more databases 124 of the storage unit 122. A plurality of road network data sources may include a variety of types of data sources, including map services and/or databases that provide information regarding road networks such as the connections between roads as well as traffic control information related to such roads (e.g., the existence and/or location of traffic control signals and/or speed zones).

Figure 2A:
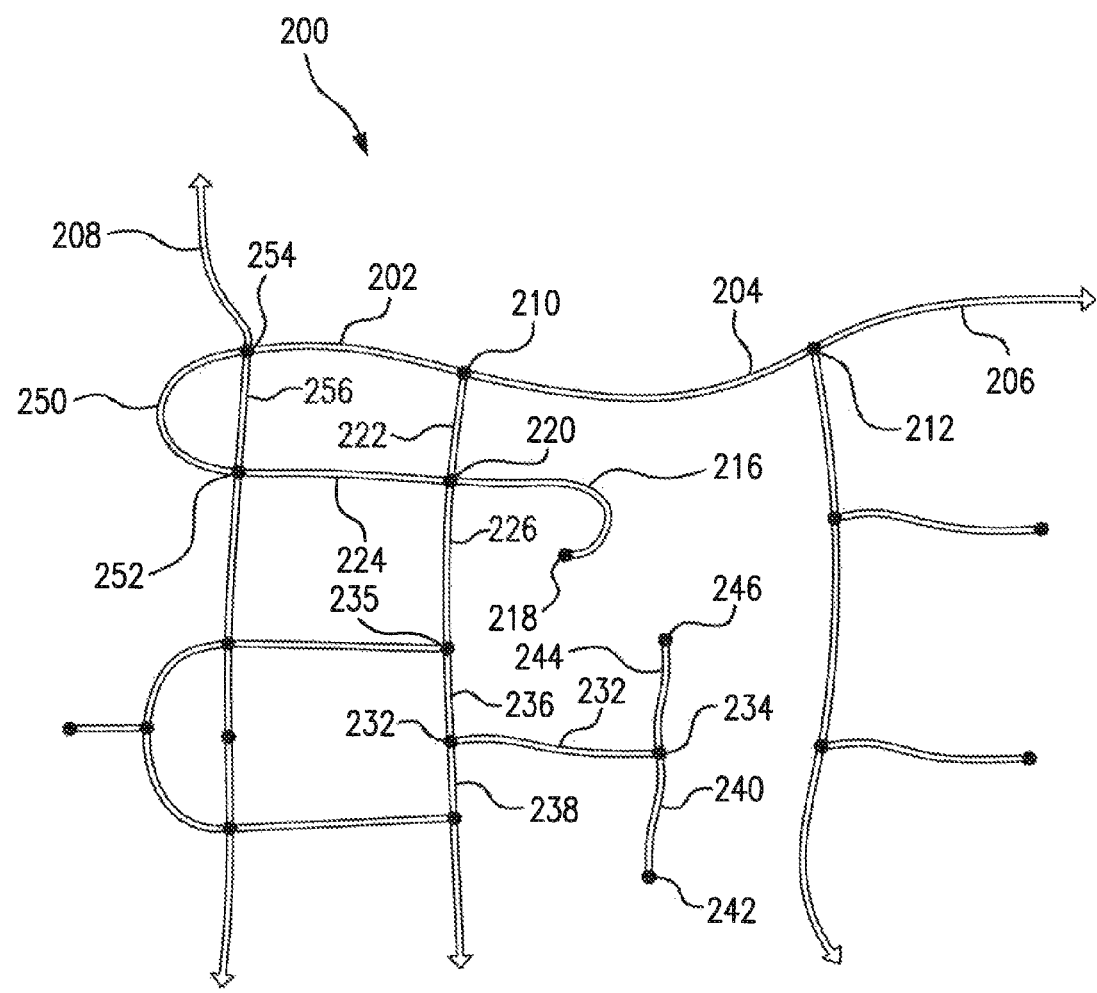
FIG. 2A shows a map that illustrates a road network within a portion of a geographic region.

FIG. 2A shows an exemplary map that illustrates a road network 200 within a portion of a geographic region. The road network map 200 may be provided by one of the aforementioned road network data sources. The road network 200 illustrates geographic navigable features, which among other things may include roadways and intersections of the roadways. In some embodiments, each of the geographic features may be identified by its physical location (latitude, longitude, and optionally absolute or relative altitude).

In one embodiment, each roadway in the road network 200 is represented by one or more segments, 202, 204, 206, 208 and so forth, such as shown in FIG. 2A. A segment may represent a road or a portion of the road. Other road segments depicted in FIG. 2A include exemplary segments 216, 222, 224, 226, 230, 236, 238, 240, 244, 250, 256. Road segments may further be connected to or otherwise associated with other adjacent road segments, thereby forming a network of road segments. Each road segment is shown to have associated with it two nodes. For example, segment 204 has two nodes 210 and 212 associated with it. One of the two nodes represents the point at one end of the segment and the other node represents the point at the other end of the segment. The node at either end of a segment may correspond to a location at which the road meets another road such as an intersection, or where the road dead-ends or terminates. Other nodes depicted in FIG. 2A include exemplary nodes 218, 220, 232, 234, 235, 242, 246, 252, 254. It should be understood that the terms "nodes" and "segments" represent just one particular terminology for describing the components of the physical road network and other terminology for these features is encompassed within the scope of these concepts.

In a particular embodiment, a multi-lane road that has one or more lanes for travel in each of two directions may be associated with at least two road segments, with at least one road segment associated with travel in one direction and with at least one other road segment associated with travel in the other direction. In addition, multiple lanes of a single road for travel in a single direction may be represented by multiple road segments in some situations, such as if the lanes have differing travel condition characteristics. For example, a given freeway system may have express or high occupancy vehicle ("HOV") lanes that may be beneficial to represent by way of road segments distinct from road segments representing the regular (e.g., non-HOV) lanes traveling in the same direction as the express or HOV lanes.

Figure 2B:
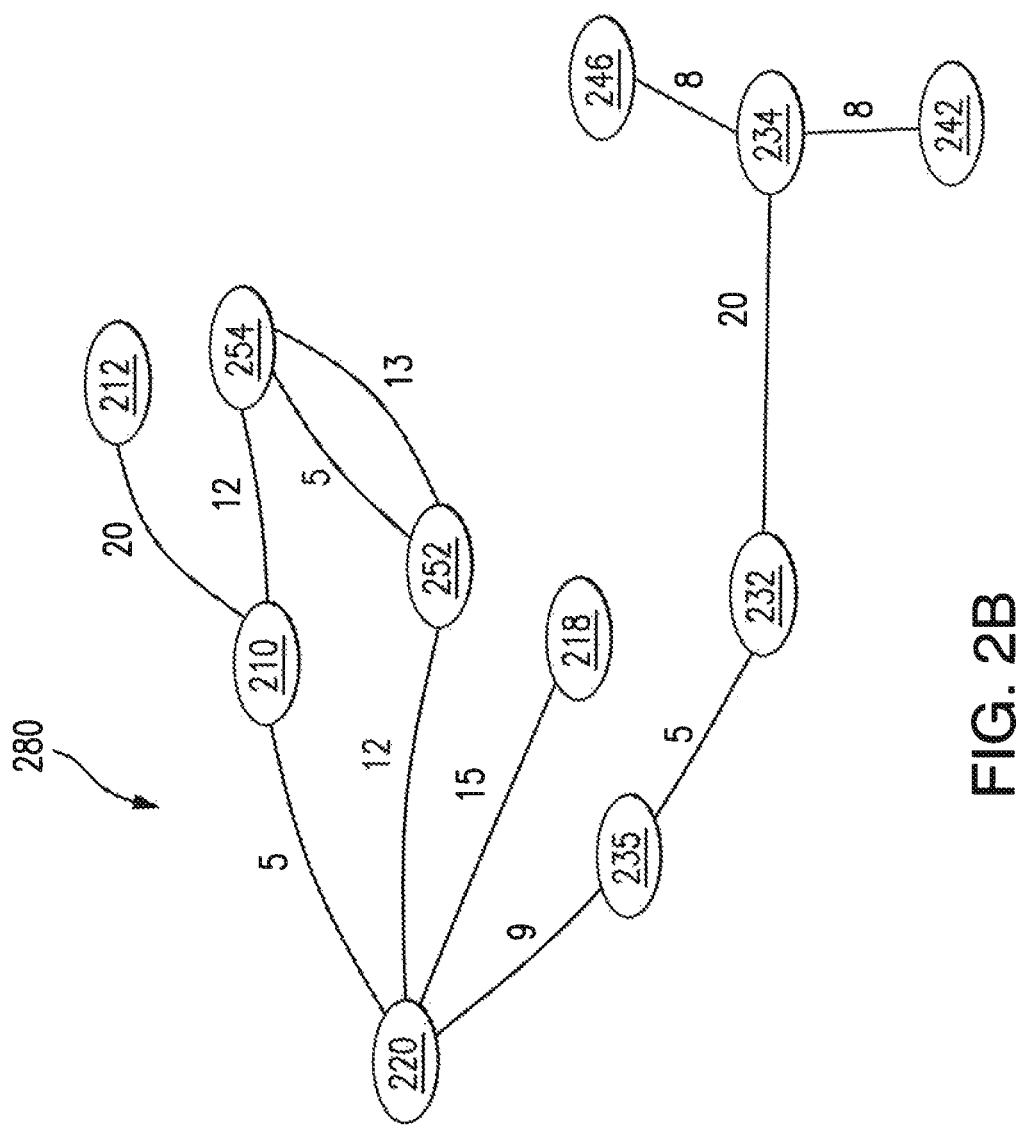
FIG. 2B illustrates an exemplary directed graph generated to represent a portion of the map of FIG. 2A, in accordance with an illustrative embodiment of the present invention.

According to an embodiment of the present invention, the provided road network may be converted into a graph data structure. FIG. 2B illustrates an exemplary directed graph generated to represent a portion of the map of FIG. 2A, in accordance with an illustrative embodiment of the present invention. The directed graph data structure generation may be based on the usage of the digital map 200, where road intersections are nodes in the graph, and road segments are edges. A directed graph refers to a graph in which the edges connecting nodes have a direction. In various embodiments further information may be appended to the graph data structure, such as the road signs and markings and traffic lights. The directed graph data structure may be also stored in one or more databases 124.

FIG. 2B shows the arrangement of vertices in the graph 280. The vertices in the graph 280 represent corresponding nodes illustrated in FIG. 2A. For example, in FIG. 2B, a vertex 220 has vertices 210, 218, 235 and 252 as adjacent vertices, and the distances to the adjacent vertices are 5, 15, 14 and 12, respectively. In some embodiments additional information may be appended to each graph edge, such as speed limit, number of lanes, and the like.

In one embodiment, the graph 280 can be further converted into a set of states, where each graph edge corresponds to a state of the object road network model. Each graph edge indicates that an object is travelling on a particular road segment or part of a road segment in a particular direction. In other words, any path travelled by an object along any portion of the road network may be represented as a series of events causing the road network model to transition from the state of one starting edge through a graph node to which the graph edge in question is connected to the state of another edge. Each graph node represents an intersection indicating a possible change in object's direction of travel. Because a typical graph of a road network may contain millions of edges, the process to compute the path most likely traveled during the given time period would potentially involve processing millions of states and can be time consuming and computationally expensive depending on the computational algorithm utilized. However, by converting the road network map 200 into structured data, e.g., a directed graph 280, geolocation application 120 may analyze the structured data with graph-theoretic analysis to quantify relationships among corresponding states.

Figure 3:
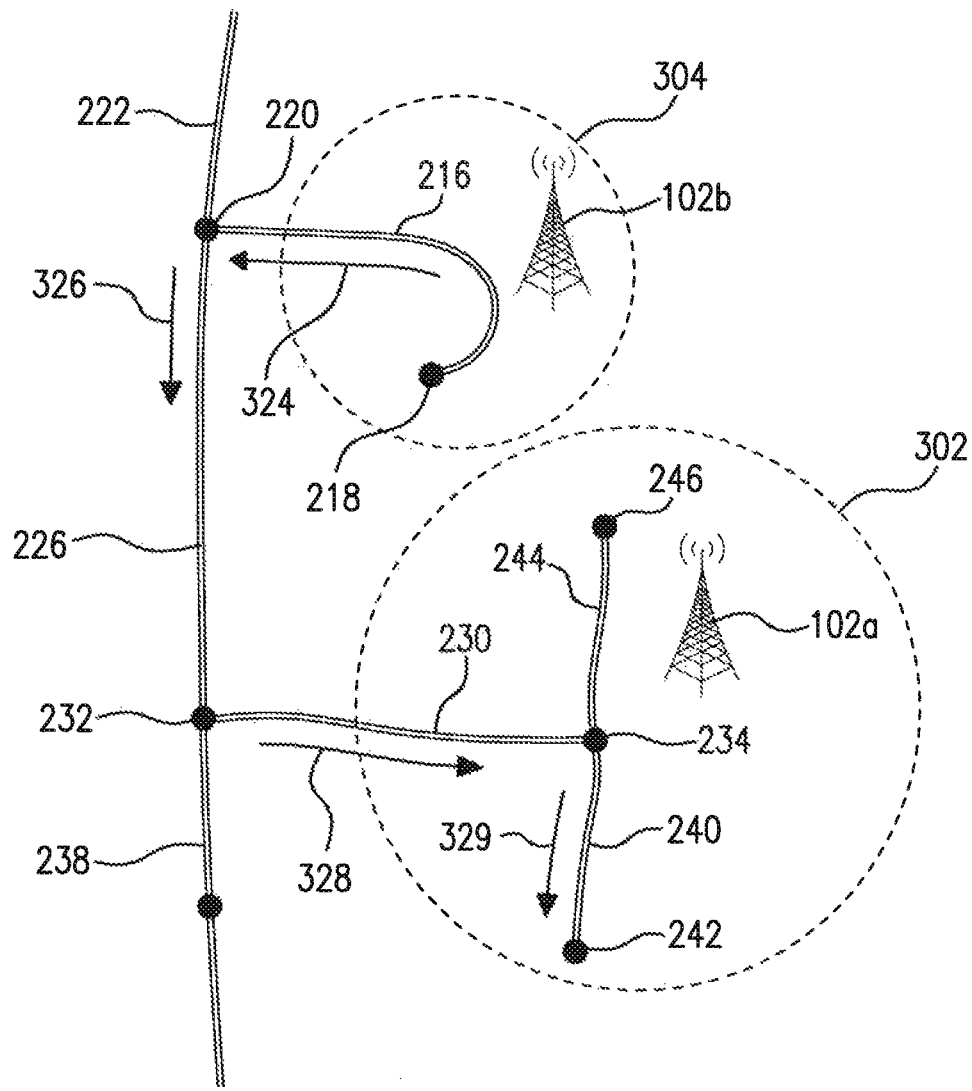
FIG. 3 shows a portion of the map of FIG. 2A to illustrate progression of exemplary processing of time series network data in conjunction with road network data, in accordance with an embodiment of the present invention.

It is noted that road network information described above is utilized by geolocation application 120 to augment collected network-related information provided by the base stations 102*a-e*. FIG. 3 shows a portion of the map of FIG. 2A to illustrate logical progression of an exemplary processing of time series network data in conjunction with road network data, in accordance with an embodiment of the present invention. For this example, assume that for a given time series data the first few communication events associated with the mobile device of interest 104 have been received from a second base station 102*b* depicted in FIG. 3. Region 304 represents an exemplary geographic area serviced by the second base station 102*b*. If successive communication events have been received from different points along segment 216, geolocation application 120 may correlate those events to determine a direction of travel 324 of mobile device 104. In addition to determining the direction of travel 324, geolocation application 120 may designate edge 216 (more specifically, travel along edge 216 in the direction of arrow 324) as the initial estimated location of the mobile device 104, since in this simplified example region 304 includes only one node 218 and an isolated portion of the road network containing just one road segment 216. Note that in an actual system, region 304 may include hundreds of road segments. Thus, in some embodiments, geolocation application 120 may designate a plurality of road segments, for example one hundred segments, as the initial estimated locations. The processing will be further described in conjunction with the directed graph 280 depicted in FIG. 2B.

According to the described below location determination procedure, geolocation application 120 may initiate a graph search procedure at edge 216 (the origin) and may proceed to node 220. Continuing with graph 280, at node 220, geolocation application 120 may determine a set of edges reachable from node 220, i.e. edges connecting node 220 to nodes 252, 210 and 235 (see FIG. 2A and FIG. 2B) and may determine probability distribution associated with each of those edges, as described below. Accordingly, the geolocation application 120 may process successive communication events in the given time series data to further explore edges connecting node 220 with each reachable node 252, 210 and 235. By continuously correlating time series data provided by the base stations 102 with the road network data for each reachable edge, the geolocation application 120 may eventually determine the destination point, for example, node 242. Thus, by processing the provided time series data in combination with road network data, the geolocation application 120 preferably determines a route most likely travelled by the mobile device 104 during the given period of time. In the example illustrated in FIG. 3, the geolocation application 120 determines that mobile device of interest travelled from the initial estimated location 218 to destination point 242 along road segments 216, 226, 230 and 240 in the direction represented by arrows 324, 326, 328 and 329, respectively. Advantageously, the geolocation application 120 matches up road network information with the provided time series data to simplify calculation process by eliminating time series data corresponding to segments not likely travelled by the mobile device of interest.

Figure 4:
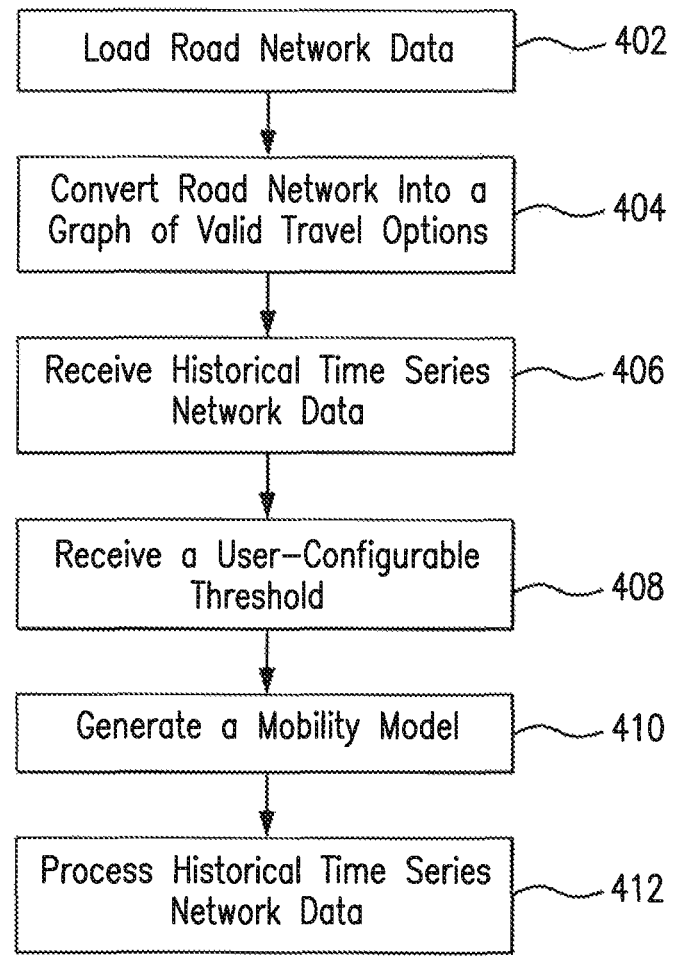
FIG. 4 is a flowchart of operational steps of a geolocation application used in the wireless communication system of FIG. 1 in accordance with illustrative embodiments of the present invention.
Figure 5:
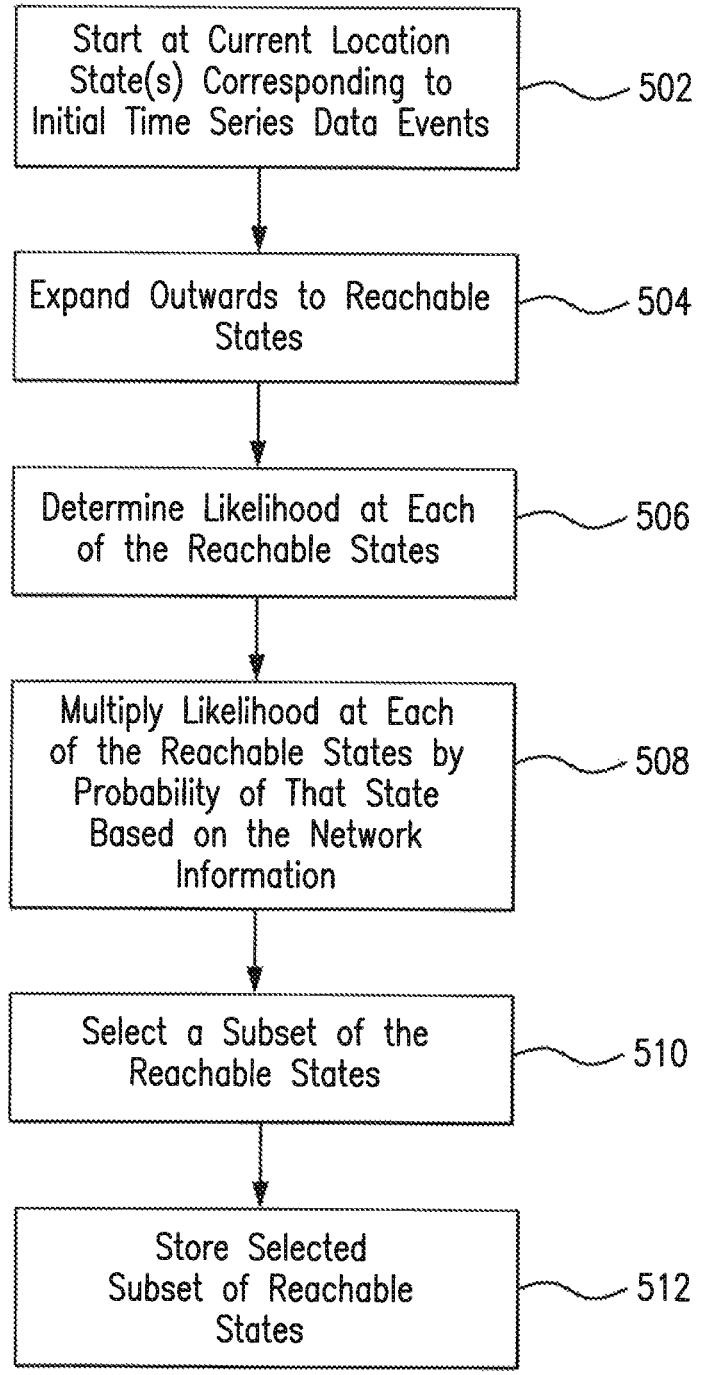
FIG. 5 is a flowchart of an embodiment of a Process Time series Network Data routine of FIG. 4.

FIG. 4 is a flowchart of operational steps of a geolocation application used in the wireless communication system of FIG. 1 in accordance with illustrative embodiments of the present invention. FIG. 5 is a flowchart of an embodiment of a Process Time series Network Data routine of FIG. 4. Before turning to descriptions of FIGS. 4 and 5, it is noted that the flow diagrams in FIGS. 4 and 5 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more steps may be omitted. In some embodiments, one or more additional steps may be performed. As will be appreciated by one skilled in the art, aspects of the present invention may be embodied as a method or computer program product.

According to an embodiment of the present invention, geolocation application 120 determines the historical motion patterns of a mobile device user based on map data including a road network of the geographical region in which the mobile device user is located. Thus, at 402, geolocation application 120 may load road network data from one or more geospatial data sources. With the rapid improvement of geospatial data collection techniques, a large amount of geospatial data is now readily available. Examples of well-known road network data sources include U.S. Census TIGER/Line files (covering most roads within the United States), NAVSTREETS from NAVTEQ, and the GDT data from Geographic Data Technology. National Map, Geography Network from Environmental Systems Research Institute (ESRI), MapQuest, Yahoo Map service, Google Map/Imagery service, Microsoft TerraService, and Space Imaging, are additional examples of map and satellite imagery repositories.

Next, at step 404, geolocation application 120 may transform at least a portion of the loaded road network into a directed graph of valid travel options. During this transformation, road intersections in the road network become vertices in the generated graph data structure. Additionally, in one embodiment of the present invention, any two nodes in the graph are connected by edges if: the corresponding segments in the road network are connected at a common vertex and if there is no turn restriction prohibiting traversal between the corresponding segments in the road network. FIG. 2B illustrates an exemplary directed graph 280 generated to represent a portion of the map of FIG. 2A, in accordance with an illustrative embodiment of the present invention. One advantage of the directed graph approach is that graph search algorithms can be used to find travel routes that honor all turn restrictions and/or road signs. In various embodiments, one or more portions of the loaded road network may be transformed into a directed graph data structure, such as directed graph 280, either ahead of time, or at runtime. Further, the directed graph 280 can be further converted into a set of states, where each graph edge corresponds to a state of the object road network model.

At step 406, geolocation application 120 may retrieve network traffic data associated with the mobile device of interest. The network traffic data can be generated by different components of the wireless network system, such as base stations 102a-e depicted in FIG. 1. In the preferred embodiment of the present invention, the desired network traffic data may include control-plane data, such as but is not limited to: location update or total location update (which includes different types of location update such as location area update), periodic location update, attaching location update; sum of mobility rate; handover, which may be directional handover or handover due to a specific cause (e.g., power budget handover); calls, which may be mobile device terminating call or mobile device originating call; ratio of mobility behavior causing handover, ratio of calls causing handover; SMS (Short Message Service) counter; paging, and the like. Each of the desired network traffic data items may help reflect a specific aspect of mobility behavior of the subscribers. As data is generated from the base stations 102a-e, such data can be associated with timestamps. In a preferred embodiment, geolocation application 120 may receive network data items (at least the location update and handover data items) as time series network data. It is noted various measurements provided as network traffic data may be non-conformant to the Gaussian distribution (i.e. multi-modal).

Because a typical graph of a road network, such as graph 280 generated at step 404, may contain millions of edges and since runtime performance of the travelled path computation technique is a function of network size, this process to compute the path most likely traveled during a given time period would involve processing millions of states and can be time consuming and computationally expensive depending on the computational procedure utilized. Accordingly, in a preferred embodiment, it may be desirable to limit the number of possible states used by geolocation application 120 to a predetermined threshold value. The threshold value may be a user configurable parameter representing a maximum number of states being used for calculation purposes. In one embodiment, the threshold value may range between 10 possible states (i.e. 10 edges in graph 280) and 10,000 possible states. In a preferred embodiment, the threshold value can be tuned based on the computational resources available at the geolocation server 118. Accordingly, at step 408, geolocation application 120 may obtain the configured threshold value from the database 124, for example.

At 410, geolocation application 120 may generate a mobility model based on the graph generated at step 404. The mobility model defines the law under which the mobile device positions evolve over time. In other words, the mobility model mathematically defines transition probabilities between the pluralities of states. Examples of the mobility modeling for making a movement pattern of the mobile device of interest may include, but is not limited to, a fluid model, a random movement model, a Markov model, etc. In a preferred embodiment of the present invention, a Markov model, which has a linear directivity and a smooth movement pattern, may be used by geolocation application 120. When directivity and speed are considered in the linear movement, the Markov model is more appropriate than other mobility models. For example, if a particular mobile device is being tracked in a particular geographic area, the generated mobility model may indicate that when a user of the mobile device travels along a particular segment of a highway, he/she has a certain chance of taking an exit and a certain chance (depending on travel velocity) to reach different segments of the highway.

Further, in one embodiment, geolocation application 120 may create a state transition matrix or receive the pre-calculated state transition matrix. The state transition matrix is an N×N matrix representing, in one embodiment, the probability of the mobile device 104 moving from one state (e.g., one edge in graph 280 representing one road segment in FIG. 2A) to another state (e.g., at least another edge in graph 280 representing another road segment in FIG. 2A). The generated state transition matrix may include state transition metrics that correspond to pairs of states and which can be a number, a value, a vector, a probability between 0 and 1, and combinations thereof. In one embodiment, the two states in a pair of states may correspond to segments that are adjacent to one another. The state transition matrix may be created by geolocation application 120 using prior information about the anticipated velocity of the mobile device 104. The prior information can be a maximum velocity assumption. In various embodiments, the state transition matrix may be pre-loaded and stored onto the memory of geolocation server 118 or downloaded on-demand from the database 124, for example.

At 412, geolocation application 120 may process historical time-series network data using the mobility model and/or state transition matrix generated at step 410 to provide an estimate of actual route most likely travelled by the mobile device 104 during the time period of interest. FIG. 5 is a detailed flowchart illustrating sub-steps of step 412 in FIG. 4. Further, as described above, FIG. 3 shows a portion of the map of FIG. 2A to illustrate progression of an exemplary processing of time series network data in conjunction with road network data, in accordance with an embodiment of the present invention.

Referring to FIG. 5 now, at 502, geolocation application 120 may start processing at current location states corresponding to initial time series data events. In other words, geolocation application 120 may utilize one or more initial events in the provided time series data to determine a rough estimate of mobile device's 104 initial position at the beginning of the time period of interest. Typically the correlation of a discrete network data item (i.e. discrete communication event) to a precise state is rather weak. However, the discrete network data item may correlate well to a subset of states. For example, if the discrete network data item being processed indicates that the mobile device 104 at certain instance of time was at a particular distance from a base station, this discrete network data item may correlate well with a first plurality of states representing particular road segments on the corresponding geographic map. At the same time, the same discrete network data item may make a second plurality of states very unlikely. In many cases, depending on the road network size under consideration, the second plurality of states may be substantially larger than the first plurality of states, thus effectively reducing the amount of processing involved during succeeding steps. In a preferred embodiment this first plurality of states may be designated as initial location states. Initial location states should be chosen by geolocation application 120 from among those location states having the best correlation with the initial time series data.

Once the initial states are determined, geolocation application 120 may step through the received time series data in a chronological manner to improve on initial geolocation estimates. In one embodiment, at step 504, geolocation application 120 may utilize graph 280 to expand outwards to a set of reachable states from the determined initial states. In one embodiment, geolocation application 120 may determine a time instance associated with the succeeding communication event in the time series data and may calculate reachable states based at least on this time instance. For example, if this time instance comprises one minute, the set of reachable states would include all potential states the mobile device could end up in originating from one of the original set of states within a one minute period. In one embodiment this initial set may include one hundred states. It should be noted that since FIG. 2B represents a highly simplified example, there is only a limited number of states shown. However, as previously indicated, in a real world example there may be millions of states corresponding to a particular map. It is noted that the set of reachable states may include duplicate states, because it might be possible to reach the same state via different routes. Accordingly, at step 504, geolocation application 120 may perform a deduplication analysis of the reachable states in order to reduce computational needs by eliminating redundant states. Continuing with the example above, assuming that geolocation application 120 identified one hundred initial location states at step 502 and assuming that it is possible to reach fifty other location states from each of the initial location states then at step 504, geolocation application 120 may generate a set of five thousand (5,000) reachable states. However, by performing the deduplication analysis, geolocation application 120 may reduce the number of reachable states to three thousand (3,000), for example.

At step 506, geolocation application 120 may utilize the mobility model described above in reference to FIG. 4 to determine likelihood (probability distribution) of each reachable state identified in step 504. In other words, this step may involve assigning a first weighting factor to each reachable state based on the probabilities in the mobility model.

To enhance geolocation estimation even further, according to an embodiment of the present invention, geolocation application 120 may also assign a second weighting factor to each of the reachable states based on the network data. Specifically, as geolocation application 120 processes time series network data, each network data item has some likelihood of being associated with a particular location state. According to a preferred embodiment, at step 508, geolocation application 120 may multiply the first weighting factor associated with each of the reachable states based on the mobility model (calculated at step 506) by a second weighting factor which may be assigned to each reachable state based on correlation of communication events contained within the time series network data.

Further, based on calculation of first and second weighting factors performed at steps 506 and 508, at 510 geolocation application 120 may select a subset of the reachable states. For example, geolocation application 120 may select ten (10) states having the highest cumulative likelihood from the three thousand (3,000) states remaining after the deduplication process.

According to a preferred embodiment, at step 512, geolocation application 120 may store the association between initial states and the selected subset of reachable states in order to build up the most likely travel history associated with the mobile device under consideration. It should be noted that geolocation application 120 preferably repeats steps 504-512 in an incremental fashion until entire time series data corresponding to the time interval of interest is processed. At the conclusion of this process, geolocation application 120 may determine a state corresponding to a destination point location for the time interval of interest by selecting the state having the highest cumulative probability. Further, since the resultant most likely state is associated with its complete history in the form of preceding states having highest probability, at this computational point geolocation application 120 is capable of closely estimating an actual route most likely travelled by the mobile device during the given time period based on the combined road network data and wireless network data.

In summary, embodiments of the present invention are directed to a computationally feasible technique for determining mobile device location history via multiple historical predictors. Advantageously, this technique is adaptive to network data measurements having non-gaussian distributions. The method disclosed by various embodiments described above may be invoked in response to receiving a customer service call from a user of the mobile device. The disclosed technique facilitates analysis of wireless network time series data corresponding to time periods both prior to and subsequent to one or more handover issues which may have led to the customer service call.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
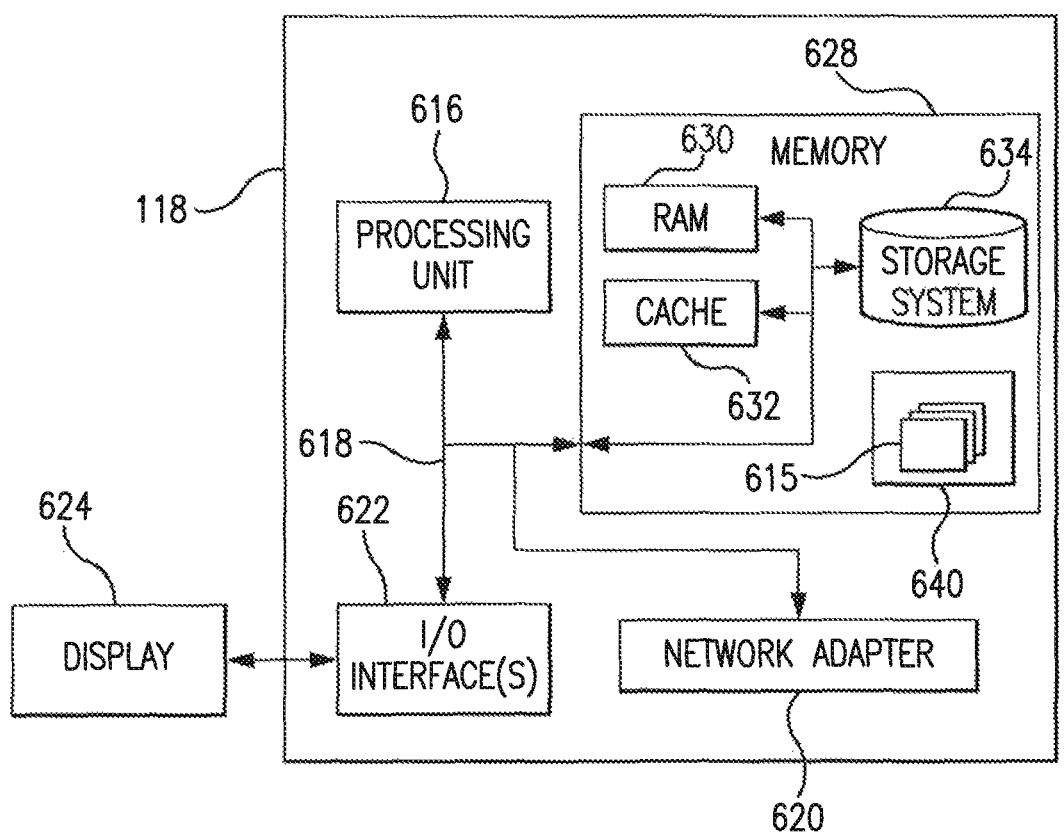
FIG. 6 illustrates internal and external components of a geolocation server computer of FIG. 1 in accordance with an illustrative embodiment of the present invention.

Embodiments of geolocation application 120 may be implemented or executed by one or more computer systems. One such computer system, geolocation server 118 is illustrated in FIG. 6. In various embodiments, geolocation server 118 may be a server, a mainframe computer system, a workstation, a network computer, a desktop computer, a laptop, or the like.

Geolocation server 118 is only one example of a suitable system and is not intended to suggest any limitation as to the scope of use or functionality of embodiments of the invention described herein. Regardless, geolocation server 118 is capable of being implemented and/or performing any of the functionality set forth hereinabove.

Geolocation server 118 is operational with numerous other general purpose or special purpose computing system environments or configurations. Examples of well-known computing systems, environments, and/or configurations that may be suitable for use with geolocation server 118 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Geolocation server 118 may be described in the general context of computer system-executable instructions, such as program modules, being executed by a computer system. Generally, program modules may include routines, programs, objects, components, logic, data structures, and so on that perform particular tasks or implement particular abstract data types. Geolocation server 118 may be practiced in distributed data processing environments where tasks are performed by remote processing devices that are linked through a communications network. In a distributed data processing environment, program modules may be located in both local and remote computer system storage media including memory storage devices.

Geolocation server 118 is shown in FIG. 6 in the form of a general-purpose computing device. The components of geolocation server 118 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Geolocation server 118 typically includes a variety of computer system readable media. Such media may be any available media that is accessible by geolocation server 118, and it includes both volatile and non-volatile media, removable and non-removable media.

System memory 628 can include computer system readable media in the form of volatile memory, such as random access memory (RAM) 630 and/or cache memory 632. Geolocation server 118 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 615, such as geolocation application 120, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 615 generally carry out the functions and/or methodologies of embodiments of the invention as described herein.

Geolocation server 118 may also communicate with one or more external devices 614 such as a keyboard, a pointing device, a display 624, etc.; one or more devices that enable a user to interact with geolocation server 118; and/or any devices (e.g., network card, modem, etc.) that enable geolocation server 118 to communicate with one or more other computing devices. Such communication can occur via Input/Output (I/O) interfaces 622. Still yet, geolocation server 118 can communicate with one or more networks such as a local area network (LAN), a general wide area network (WAN), and/or a public network (e.g., the Internet) via network adapter 620. As depicted, network adapter 620 communicates with the other components of geolocation server 118 via bus 618. It should be understood that although not shown, other hardware and/or software components could be used in conjunction with geolocation server 118. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining location history of a mobile device, comprising the steps of:
   determining, by a processor, a plurality of states corresponding to a plurality of reachable road segments associated with a road network based on one or more initial estimated locations of the mobile device;
   generating, by the processor, a mobility model defining transition probabilities between the determined plurality of states;
   receiving, by the processor, time series network data associated with the mobile device from a network data source, wherein the time series network data is associated with a given period of time and wherein the time series network data comprises information relating to at least a plurality of signal strength measurements, a plurality of propagation path time measurements and information relating to transmission error rates associated with the mobile device; and
   processing, by the processor, the time series network data using the generated mobility model to estimate an actual route travelled by the mobile device along a portion of the road network during the given period of time.

2. The method of claim 1, wherein the time series network data does not conform to the Gaussian distribution.

3. The method of claim 1, wherein generating the mobility model comprises generating a directed graph data structure representing a plurality of valid travel options from the initial one or more estimated locations of the mobile device.

4. The method of claim 1, wherein processing the time series network data using the generated mobility model comprises correlating each element of the time series network data with a first subset of the plurality of states corresponding to the plurality of reachable road segments.

5. The method of claim 4, wherein generating the mobility model comprises determining a plurality of likelihood values associated with the plurality of states corresponding to the plurality of reachable road segments and wherein the correlating step comprises:
   multiplying each of the plurality of likelihood values associated with the plurality of states by a probability of a corresponding reachable road segment calculated based on a corresponding element of the time series network data; and
   selecting a second subset of the plurality of states, the second subset including states having highest cumulative probabilities based on said multiplication.

6. The method of claim 1, wherein the mobility model comprises a Markov model.

7. The method of claim 4, wherein the first subset of the plurality of states is associated with a user-configurable threshold value representing a maximum number of states being used for calculation purposes.

8. A computer program product for determining location history of a mobile device, the computer program product comprising:
   one or more non-transitory computer-readable storage devices and a plurality of program instructions stored on at least one of the one or more non-transitory computer-readable storage devices, the plurality of program instructions comprising:
   program instructions to determine a plurality of states corresponding to a plurality of reachable road segments associated with a road network based on one or more initial estimated locations of the mobile device;
   program instructions to generate a mobility model defining transition probabilities between the determined plurality of states;
   program instructions to receive time series network data associated with the mobile device from a network data source, wherein the time series network data is associated with a given period of time and wherein the time series network data comprises information relating to at least a plurality of signal strength measurements, a plurality of propagation path time measurements and information relating to transmission error rates associated with the mobile device; and program instructions to process the time series network data using the generated mobility model to estimate an actual route travelled by the mobile device along a portion of the road network during the given period of time.

9. The computer program product of claim 8, wherein the time series network data does not conform to the Gaussian distribution.

10. The computer program product of claim 8, wherein the program instructions to generate the mobility model comprise program instructions to generate a directed graph data structure representing a plurality of valid travel options from the initial one or more estimated locations of the mobile device.

11. The computer program product of claim 8, wherein program instructions to process the time series network data using the generated mobility model comprise program instructions to correlate each element of the time series network data with a first subset of the plurality of states corresponding to the plurality of reachable road segments defined by the generated mobility model.

12. The computer program product of claim 11, wherein the program instructions to generate the mobility model comprise program instructions to determine a plurality of likelihood values associated with the plurality of states corresponding to the plurality of reachable road segments and wherein the program instructions to correlate comprise:
    program instructions to multiply each of the plurality of likelihood values associated with the plurality of states by a probability of a corresponding reachable road segment calculated based on a corresponding element of the time series network data; and
    program instructions to select a second subset of the plurality of states, the second subset including states having highest cumulative probabilities based on said multiplication.

13. The computer program product of claim 12, wherein the program instructions to generate the mobility model comprise program instructions to generate a Markov model.

14. The computer program product of claim 11, wherein the first subset of the plurality of states is associated with a user-configurable threshold value representing a maximum number of states being used for calculation purposes.

15. A computer system for determining location history of a mobile device, the computer system comprising one or more processors, one or more non-transitory computer-readable storage devices, and a plurality of program instructions stored on at least one of the one or more non-transitory storage devices for execution by at least one of the one or more processors, the plurality of program instructions comprising:
    program instructions to determine a plurality of states corresponding to a plurality of reachable road segments associated with a road network based on one or more initial estimated locations of the mobile device;
    program instructions to generate a mobility model defining transition probabilities between the determined plurality of states;
    program instructions to receive time series network data associated with the mobile device from a network data source, wherein the time series network data is associated with a given period of time and wherein the time series network data comprises information relating to at least a plurality of signal strength measurements, a plurality of propagation path time measurements and information relating to transmission error rates associated with the mobile device; and
    program instructions to process the time series network data using the generated mobility model to estimate an actual route travelled by the mobile device along a portion of the road network during the given period of time.

16. The computer system of claim 15, wherein the time series network data does not conform to the Gaussian distribution.

* * * * *